US008363170B2

(12) United States Patent
Kostepen (10) Patent No.: US 8,363,170 B2
(45) Date of Patent: Jan. 29, 2013

(54) DUAL DISPLAY MULTI-MODAL VEHICLE INFOTAINMENT SYSTEM

(75) Inventor: Hakan Kostepen, Peachtree City, GA (US)

(73) Assignee: Panasonic Automotive Systems Company of America, division of Panasonic Corporation of North America, Peachtree City, GA (US)

( * ) Notice: Subject to any disclaimer, the term of this patent is extended or adjusted under 35 U.S.C. 154(b) by 1602 days.

(21) Appl. No.: 11/818,488

(22) Filed: Jun. 14, 2007

(65) Prior Publication Data

US 2008/0309820 A1    Dec. 18, 2008

(51) Int. Cl.
*H04N 5/64*    (2006.01)
*G09G 5/00*    (2006.01)

(52) U.S. Cl. ................. 348/837; 348/840; 345/1.1

(58) Field of Classification Search .......... 348/836, 348/837, 839, 840, 794; 345/1.1, 1.3; 361/728, 361/729
See application file for complete search history.

(56) References Cited

U.S. PATENT DOCUMENTS

| | | | | |
|---|---|---|---|---|
| 5,222,780 A * | 6/1993 | Reh et al. | ................. | 297/188.19 |
| D340,235 S * | 10/1993 | Robak et al. | ................. | D14/373 |
| 6,067,502 A | 5/2000 | Hayashida et al. | | |
| 6,554,238 B1 * | 4/2003 | Hibberd | ................. | 248/278.1 |
| 7,250,978 B2 * | 7/2007 | Lee et al. | ................. | 348/383 |
| 7,280,166 B2 * | 10/2007 | Nagata et al. | ................. | 348/837 |
| 7,405,773 B2 * | 7/2008 | Lester et al. | ................. | 348/825 |
| 7,593,002 B2 * | 9/2009 | Tak | ................. | 345/168 |
| D628,574 S * | 12/2010 | Woodward et al. | ................. | D14/373 |
| RE42,091 E * | 2/2011 | Moscovitch et al. | ................. | 361/679.04 |
| 7,952,863 B1 * | 5/2011 | Stifal | ................. | 361/679.21 |
| 2004/0189625 A1 | 9/2004 | Sato | | |
| 2004/0189881 A1 * | 9/2004 | Cook et al. | ................. | 348/837 |
| 2006/0012540 A1 | 1/2006 | Logie et al. | | |
| 2006/0108900 A1 | 5/2006 | Lee | | |
| 2006/0288385 A1 | 12/2006 | Vitito | | |
| 2008/0055189 A1 * | 3/2008 | Wilk et al. | ................. | 345/1.3 |
| 2008/0062625 A1 * | 3/2008 | Batio | ................. | 361/680 |
| 2008/0117578 A1 * | 5/2008 | Moscovitch | ................. | 361/681 |
| 2009/0038422 A1 * | 2/2009 | Choi | ................. | 74/89.17 |
| 2009/0109352 A1 * | 4/2009 | Lewis et al. | ................. | 348/837 |
| 2011/0050541 A1 * | 3/2011 | Shin et al. | ................. | 345/1.1 |
| 2012/0140126 A1 * | 6/2012 | Werth et al. | ................. | 348/837 |

* cited by examiner

*Primary Examiner* — Joshua J Michener
*Assistant Examiner* — Ryan Kwiecinski
(74) *Attorney, Agent, or Firm* — Laurence S. Roach (57) ABSTRACT

A vehicle includes left-hand and right-hand video monitors. Each of the video monitors includes opposing top and bottom edges and opposing left-hand and right-hand lateral edges extending between the top and bottom edges. A translation mechanism couples the video monitors to a vehicle body. The video monitors are movable between a first position wherein the right-hand lateral edge of the left-hand video monitor is spaced apart from the left-hand lateral edge of the right-hand video monitor, and a second position wherein the right-hand lateral edge of the left-hand video monitor is adjacent to the left-hand lateral edge of the right-hand video monitor.

20 Claims, 8 Drawing Sheets

DUAL DISPLAY MULTI-MODAL VEHICLE INFOTAINMENT SYSTEM

BACKGROUND OF THE INVENTION

1. Field of the Invention

The present invention relates to infotainment systems for use in vehicles, and, more particularly, to video monitors for use in vehicles.

2. Description of the Related Art

Many vehicles, such as cars, trucks, vans and recreational vehicles (RVs) are equipped with an infotainment (entertainment/information) system having a video monitor or screen capable of playing video infotainment content. These infotainment systems typically include a head unit mounted in the dashboard and a video screen mounted on the ceiling of the vehicle. The video screen is electronically coupled to the head unit and is adapted to display images of video infotainment content played by the head unit. Some systems include multiple video screens, such as separate video screens mounted in the headrest of each of the front seats and viewable by the passengers in the rear of the vehicle. Each of these video screens is configured to display identical images. That is, each screen plays a same, single stream of video infotainment content which is transmitted to the screens by the head unit. The head unit may retrieve the video infotainment content from a storage medium, such as a DVD, or may receive the video infotainment content via air-borne signals, such as from a television broadcast, for example.

Although these systems have made vehicle travel more pleasant for passengers, in some cases passengers may not agree on which infotainment content to view. For instance, one passenger may want to watch one DVD, while another passenger may prefer to watch a different DVD. In these cases, it would be beneficial to have a system that would allow passengers to simultaneously enjoy different infotainment content.

In other cases, passengers may desire to watch the same infotainment content. In this case, rather than each passenger watching the video content on separate small screens, it would be beneficial if the passengers could each enjoy such video content on a screen that is larger than can be provided by each of the monitors individually.

Accordingly, what is needed in the art is a more flexible vehicle infotainment system that enables two passengers to select whether to watch different video content on different screens or to watch the same video content on a larger screen.

SUMMARY OF THE INVENTION

The present invention provides for a multi-modal vehicle infotainment system that, in one mode, allows passengers to enjoy different streams of video content on independent, individual screens, and, in another mode, allows passengers to combine their individual screens into a single larger screen so that they may enjoy a single stream of video content on the larger screen.

In one embodiment of the invention, a vehicle includes left-hand and right-hand video monitors. Each of the monitors includes opposing top and bottom edges and opposing left-hand and right-hand lateral edges extending between the top and bottom edges. A translation mechanism couples the video monitors to a vehicle body. The video monitors are movable between a first position wherein the right-hand lateral edge of the left-hand video monitor is spaced apart from the left-hand lateral edge of the right-hand video monitor, and a second position wherein the right-hand lateral edge of the left-hand video monitor is adjacent to the left-hand lateral edge of the right-hand video monitor.

In another embodiment of the invention, an infotainment system for use in a vehicle includes a head unit mountable to the vehicle and adapted to transmit video infotainment content. First and second video monitors are communicatively coupled to the head unit. The first and second video monitors display images dependent upon video content received from the head unit. The first and second video monitors are movable between a first position and a second position. In the first position, the first video monitor is spaced apart from the second video monitor, and each of the first and second video monitors displays a respective standalone image. In the second position, the first video monitor is adjacent to the second video monitor, and each of the first and second video monitors displays a respective half of a composite image such that the half images displayed by the video monitors complement each other to form the composite image.

In yet another embodiment of the invention, a method of operating a vehicle infotainment system includes providing a head unit in the vehicle, and transmitting video infotainment content from the head unit. First and second video monitors are communicatively coupled to the head unit. The first and second video monitors are used to receive the video infotainment content. The first and second video monitors are placed in a first position wherein the first video monitor is spaced apart from the second video monitor. A respective standalone image is displayed on each of the first and second video monitors while the monitors are in the first position. The standalone images are dependent upon the received video infotainment content. The first and second video monitors are placed in a second position wherein the first video monitor is adjacent to the second video monitor. A respective half of a composite image is displayed on each of the first and second video monitors while the monitors are in the second position. The half images displayed by the video monitors complement each other to form the composite image and are dependent upon the received video infotainment content.

An advantage of the present invention is that passengers may selectively watch different video content on different individual screens or watch the same video content on a larger composite screen formed by the two individual screens.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
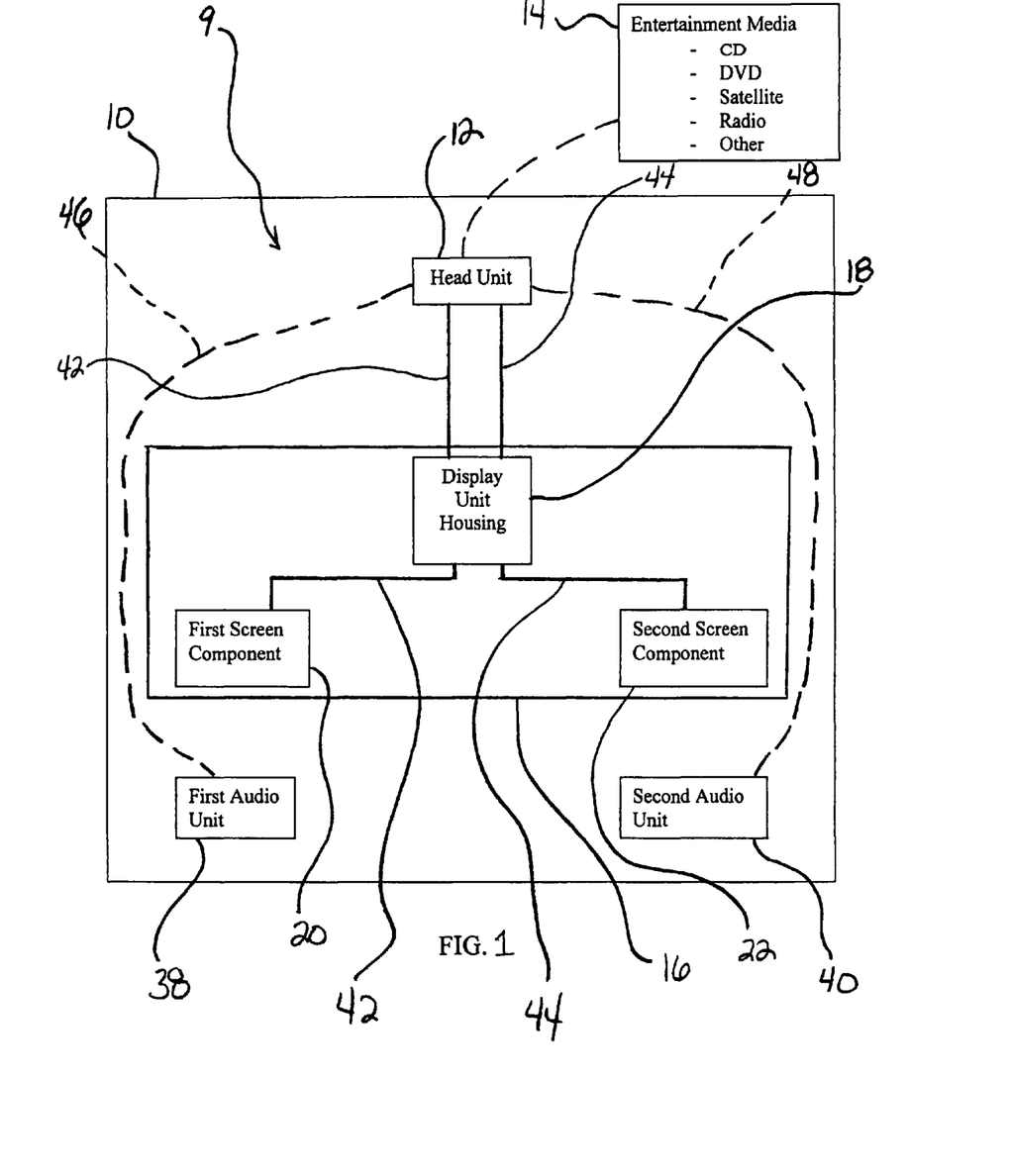
FIG. 1 is a schematic depiction of a vehicle infotainment system in accordance with one embodiment of the present invention.

Referring first to FIG. 1, vehicle infotainment system 9 in accordance with one embodiment of the present invention is adapted for use in vehicle 10, which may be, for example, an automobile, truck, recreational vehicle (RV), van, boat, airplane or other vehicle. Infotainment system 9 includes head unit 12, which is adapted to be mounted in vehicle 10 and is powered by any known means. For instance, head unit 12 may be mounted in the dashboard of vehicle 10 and electronically coupled to the electronics system of vehicle 10. Head unit 12 is adapted to receive, read and/or play audio and video infotainment media such as radio waves, satellite transmissions, digital video discs (DVD), audio and video MP3 files, compact discs, video games and other audio/video media.

Figure 2:
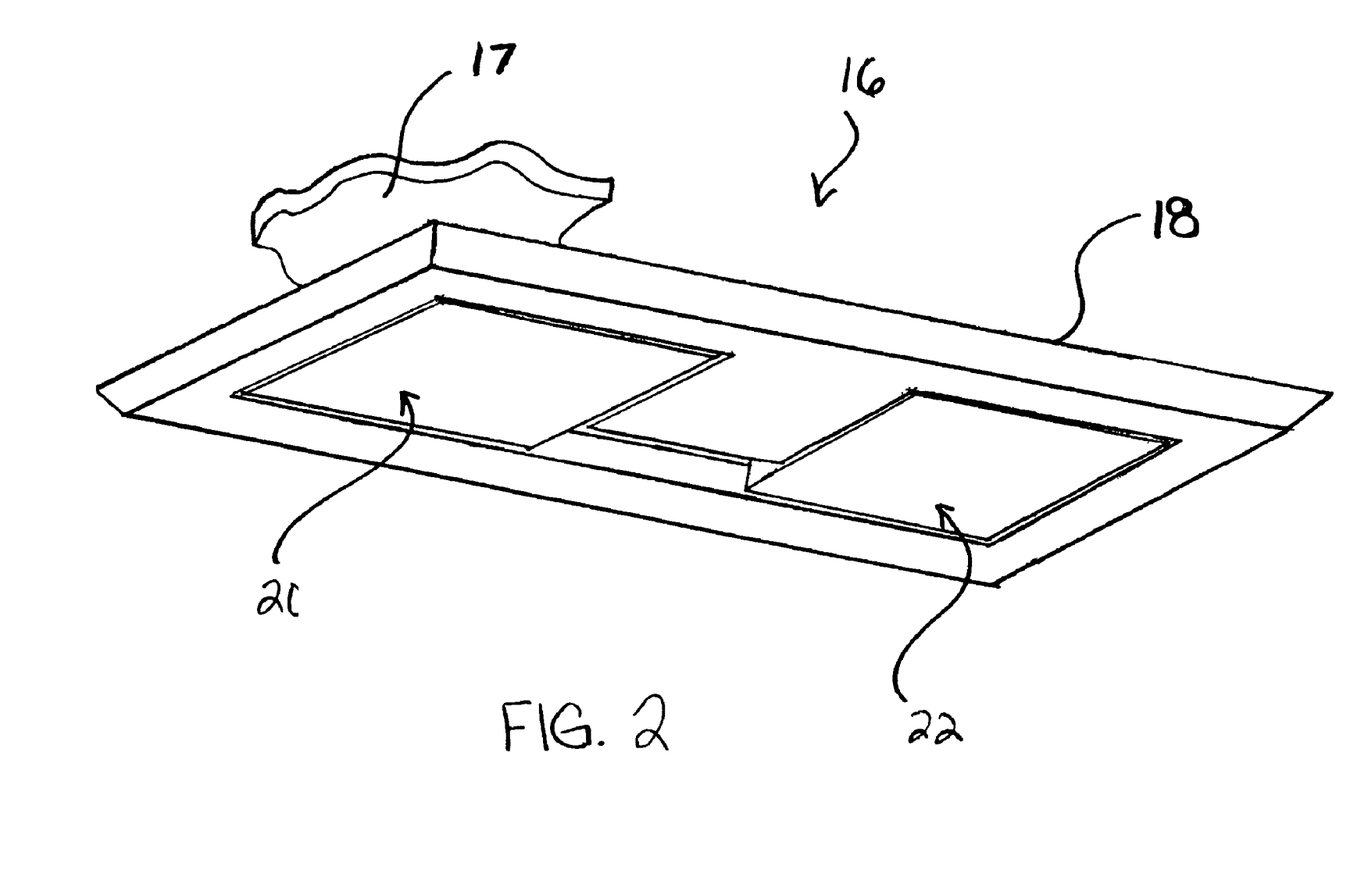
FIG. 2 is a perspective view of the display unit of the infotainment system of FIG. 1, wherein the video monitors are in a closed position.
Figure 3:
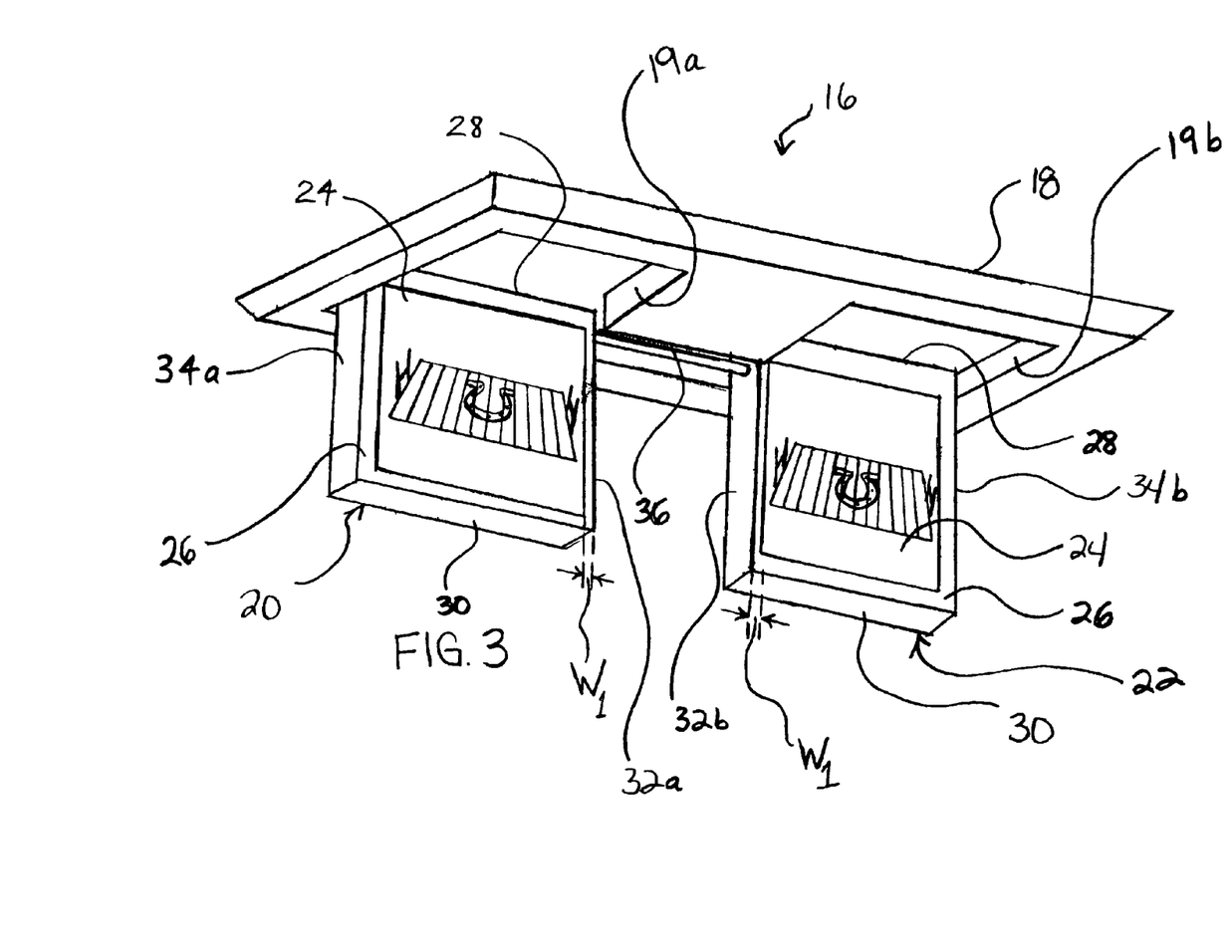
FIG. 3 is a perspective view of the display unit of FIG. 2, wherein the video monitors are in a first open position in which the video monitors are spaced apart.

Referring to FIGS. 1 and 2, infotainment system 9 also includes display unit 16, which is adapted to be mounted to vehicle 10 and is operatively and communicatively coupled to head unit 12. For example, display unit 16 may be configured to be mounted to the interior ceiling, roof, or other body component of vehicle 10. Display unit 16 may be operatively coupled to head unit 12 via wireless communication or wired communication and may be powered by any known means. Display unit 16 generally includes housing 18, which is mountable to body 17 of vehicle 10, and left-hand and right-hand screen components, referred to herein by the term "video monitors" 20, 22, which may be pivotally mounted to housing 18. As illustrated in FIG. 3, housing 18 includes a pair of recesses 19a, 19b configured to receive first and second video monitors 20, 22. First and second video monitors 20, 22 are pivotably mounted to housing 18 such that monitors 20, 22 are pivotable between a closed position (FIG. 2), wherein video monitors 20, 22 are seated in recesses 19, and an open position (FIG. 3), wherein video monitors 20, 22 extend away, i.e., downward, from housing 18.

Referring to FIG. 3, each of video monitors 20, 22 includes opposing top and bottom edges 28, 30 and opposing inner and outer lateral edges extending between top and bottom edges 28, 30. Each of video monitors 20, 22 includes frame 26 and visual display screen 24 held by frame 26. Frame 26 extends about the periphery of video monitors 20, 22. The portion of frame 26 adjacent to inner lateral edge 32 has a width $W_1$ extending from visual display screen 24 to inner lateral edge 32. As is discussed in further detail below, width $W_1$ is small enough so as not to overly obstruct or divide a shared image that may be displayed on a combination of abutting screens 24 of first and second video monitors 20, 22. The width of frame 26 in other regions of video monitors 20, 22 may vary from, e.g., may be greater than, width $W_1$. That is, width $W_1$ may be less than the widths of the three non-abutting sides of the frame of the same monitor.

Figure 4:
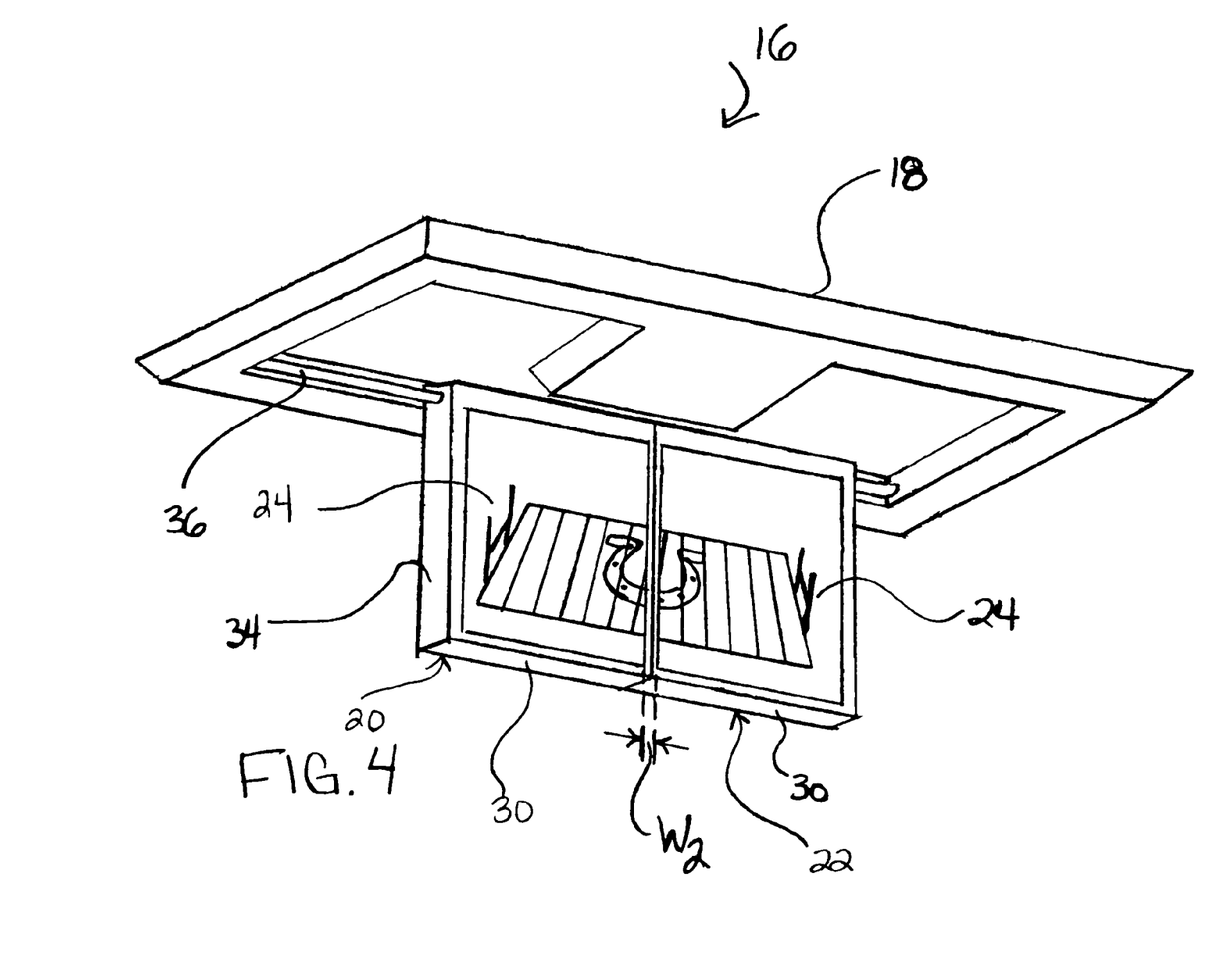
FIG. 4 is a perspective view of the display unit of FIG. 2, wherein the video monitors are in a second open position in which the video monitors are adjacent to each other.

Turning now to FIGS. 3 and 4, display unit 16 also includes translation mechanism 36, which slidably couples first and second video monitors 20, 22 to housing 18 and to vehicle body 17. Translation mechanism 36 enables video monitors 20, 22 to slide relative to housing 18 and relative to one another between first spaced-apart position, shown in FIG. 3, and second joined position, shown in FIG. 4. In the first position shown in FIG. 3, first and second video monitors 20, 22 are spaced-apart from one another such that inner (right-hand) lateral edge 32a of left-hand video monitor 20 is spaced apart from inner (left-hand) lateral edge 32b of right-hand video monitor 22. In this first position, visual display screens 24 of first and second video monitors 20, 22 form two separate viewing screens. In the second position shown in FIG. 4, first and second video monitors 20, 22 are arranged such that the inner lateral edges (not shown) or sides of first and second video monitors 20, 22 abut one another. In this second position, visual displays 24 of first and second video monitors 20, 22 are joined to form one shared viewing screen. As shown in FIG. 4, when first and second video monitors 20, 22 are in the second position, widths $W_1$ (FIG. 3) of frame 26 are combined to form width $W_2$. As discussed above, widths $W_1$, ideally, are small enough such that combined width $W_2$ does not unduly obstruct or divide combined screens 24. For instance, each of widths $W_1$ (FIG. 3) may be four millimeters or less, such that combined width $W_2$ is eight millimeters or less. In one particular embodiment, each of widths $W_1$ is three millimeters.

Referring still to FIGS. 3 and 4, translation mechanism 36 is illustrated in the form of a rod slidably extending through passages in first and second video monitors 20, 22. However, translation mechanism 36 may be any mechanism suitable for allowing first and second video monitors to slide between the first and second positions of FIGS. 3 and 4. For instance, translation mechanism 36 may be in the form of a track and trolley, tongue and groove, screw drive or other translating system. Furthermore, translation mechanism 36 may be adapted for manual operation and/or may include a motor (not shown) for automated translation of video monitors 20, 22. First and second video monitors 20, 22 may be operatively coupled to head unit 12 during translation via either wireless communication, wired communication, or other means. For instance, first and second video monitors 20, 22 may be electronically coupled to display unit housing 18 and/or head unit 12 via a flexible ribbon cable (not shown).

Figure 5:
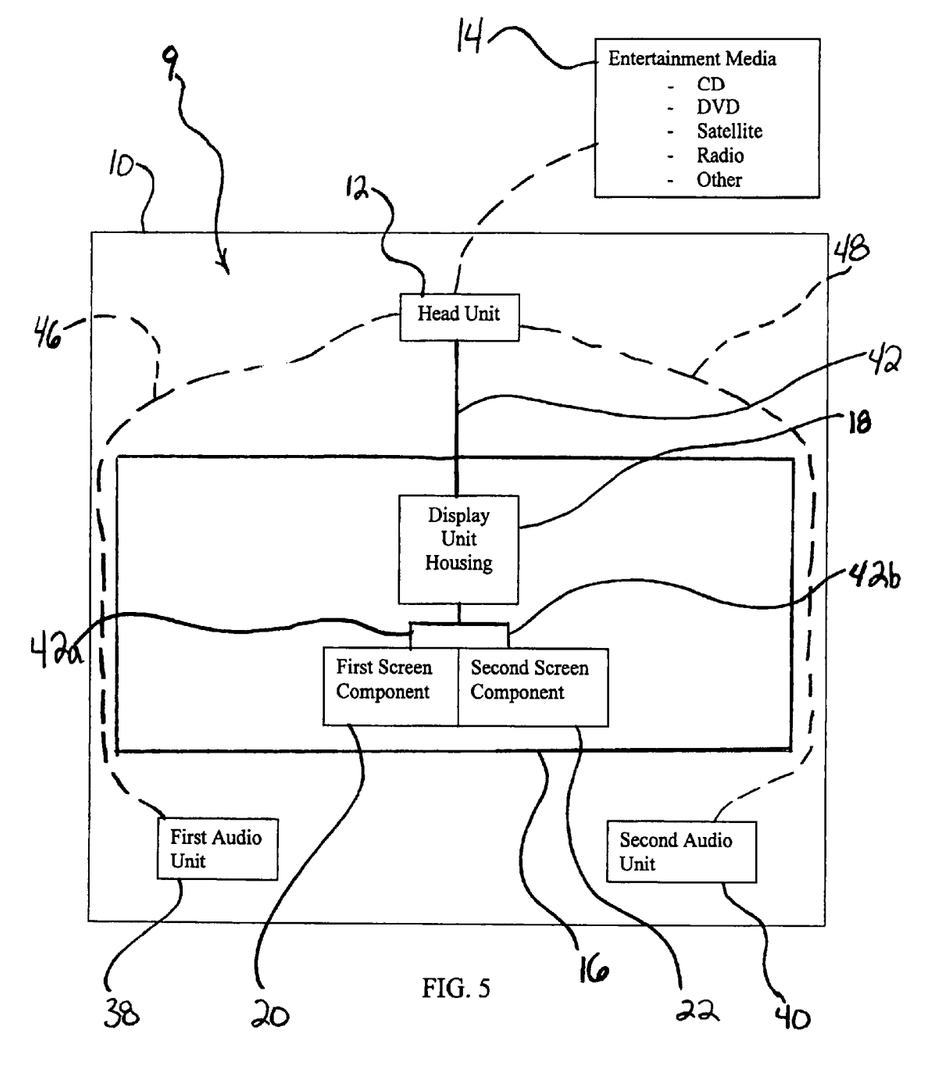
FIG. 5 is a schematic depiction of the vehicle infotainment system of FIG. 1, wherein the video monitors are in the second open position and are receiving complementary video outputs.
Figure 6:
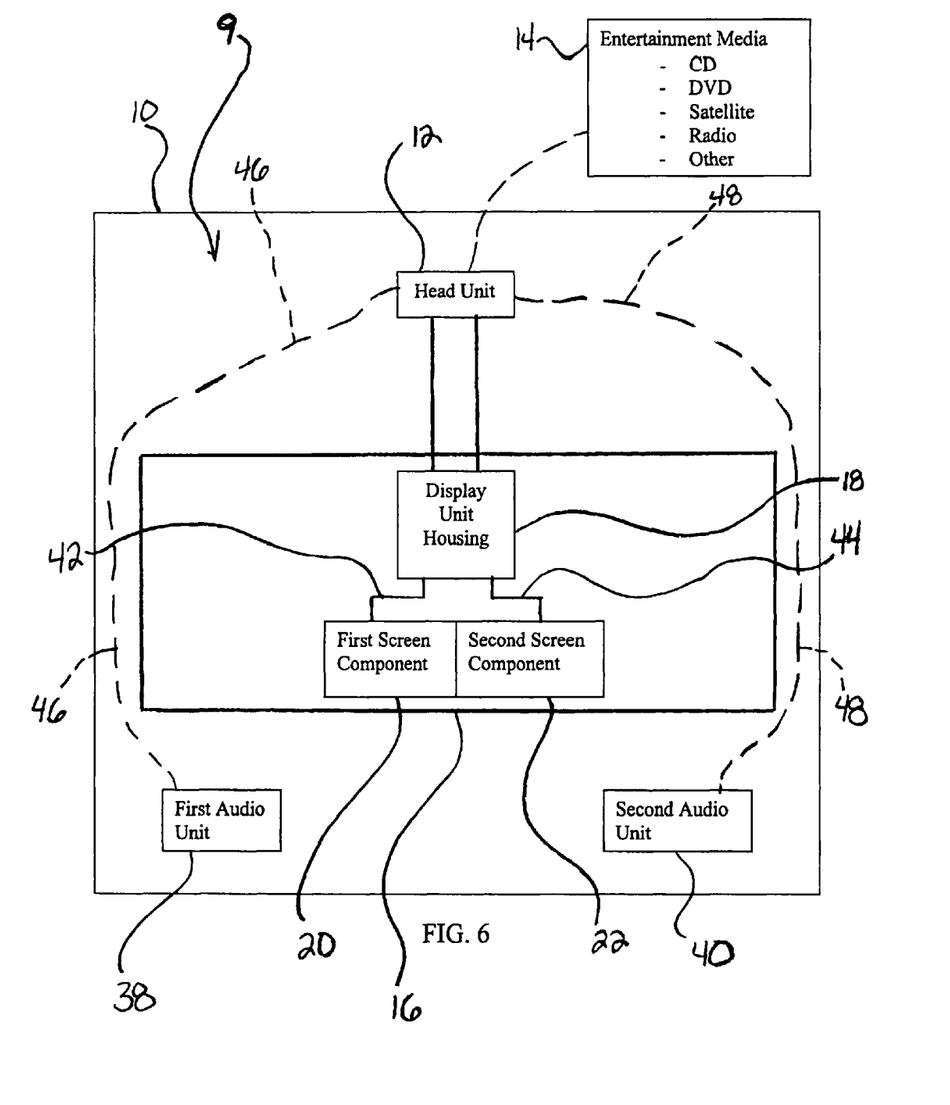
FIG. 6 is a schematic depiction of the vehicle infotainment system of FIG. 1 wherein the video monitors are in the second open position and are receiving independent video inputs.

Turning now to FIGS. 1, 5 and 6, vehicle infotainment system 9 may also include first and second audio units 38, 40. First and second audio units 38, 40 are electronically coupled to, and receive audio output signals from, head unit 12, as indicated at 46, 48. Alternatively, audio units 38, 40 may be electronically coupled to, and receive audio output signals from, display unit 16. The audio content played by audio units 38, 40 may correspond to, i.e., be synchronized with, the video content displayed by monitors 20, 22, respectively. First and second audio units 38, 40 may be in the form of wireless headphones, headphone jacks, speakers or other suitable audio units capable of receiving audio outputs, as indicated at 46, 48.

Referring now to FIGS. 1 and 3, operation of vehicle infotainment system 9 will now be discussed. In operation, head unit 12 receives infotainment media 14, such as one or more DVDs, CDs, satellite signals, digital video games, or other type of media. For exemplary sake, we assume that two passengers desire to enjoy two different media, namely, first and second DVDs. Accordingly, the user(s) selects the dual screen mode. Selection of dual screen mode may involve any known means for making electronic selections. For instance, the user may engage a dual screen mode button (not shown) located on either head unit 12 or display unit 16. As noted above, display system 16 may be equipped with a motor or other device to allow first and second video monitors 20, 22 to move between the first and second positions automatically. In this case, selection of the dual screen mode would cause first and second video monitors 20, 22 to automatically open and/or slide to the first position shown in FIG. 3. Alternatively, display system 16 may be configured to allow the user to manually slide first and second video monitors 20, 22 to the first position shown in FIG. 3.

Referring still to FIGS. 1 and 3, head unit 12 may receive and read first and second DVDs, and may send corresponding first and second video outputs 42, 44 to display unit 16. As shown in FIG. 1, first and second video monitors 20, 22 are in the first spaced apart position, also shown in FIG. 3. With first and second video monitors 20, 22 in this first position, first and second video outputs 42, 44 may be received by first and second video monitors 20, 22, respectively, thereby causing visual display screens 24 of first and second video monitors 20, 22 to display independent images corresponding respectively to first and second DVDs. Alternatively, in the first position, video monitors 20, 22 may independently display images from the same medium, as is shown in FIG. 3. More particularly, in FIG. 3, both screens 24 display a same image of a same football field, which image may be included in, or extracted from, a common satellite signal, for example.

Head unit 12 may also transmit first and second audio outputs 46, 48 to first and second audio units 38, 40. First and second audio outputs 46, 48 may correspond to first and second DVDs, and therefore may be synchronized with the images displayed on visual display screens 24 of first and second video monitors 20, 22. In this first position, vehicle infotainment system 9 is configured to display separate, but possibly equivalent, content on first and second video monitors 20, 22. Thus, two passengers may watch and listen to different DVDs, or may independently watch and listen to the playback of a same DVD on separate screens 24. It should be understood that the two different users are not limited to the same type of infotainment medium. For instance, one user may watch a DVD on first video monitor 20, while another user may play a video game on second video monitor 22.

Turning now to FIGS. 4 and 5, when so desired, user(s) may move first and second video monitors 20, 22 to the second position shown in FIG. 4 and enjoy a single infotainment medium 14 on a combined display. More particularly, user(s) selects the infotainment medium 14 of choice and selects single screen mode. The selection of single screen mode may involve any known means including, for example, engaging a button provided on head unit 12 or display unit 16. As discussed above, display unit 16 may be adapted such that selection of single screen mode may cause first and second video monitors 20, 22 to slide automatically to the second position. Alternatively, display unit 16 or head unit 12 may include a separate screen position switch or button (not shown), configured to effect the movement of video monitors 20, 22 independent of the screen selection mode. The movement of video monitors 20, 22 and/or the selection of single screen or dual screen mode may be voice-activated. In yet another alternative, users may manually slide first and second video monitors 20, 22 together to the second position.

In the second position, visual display screens 24 of first and second video monitors 20, 22 are combined to form a single display screen having a relatively small seam extending down the middle and having width $W_2$. Head unit 12 provides first video output 42 to display unit 16, which is adapted to then send video image outputs 42a, 42b to first and second video monitors 20, 22, respectively. Video image outputs 42a, 42b are complementary in that they combine to form single shared image/content on combined display screens 24. That is, in the single screen mode of the second position, each of video monitors 20, 22 displays a respective half of a complete image. The complete image is formed as a composite of the half images displayed on the two screens 24, as illustrated in FIG. 4. In the dual screen mode of the first position, in contrast, each of video monitors 20, 22 displays a standalone complete image that is independent of the image displayed on the other monitor. In the single screen mode, users enjoy a larger, wider viewing screen, which may be capable of efficiently accommodating wide-screen formats having a 16:9 aspect ratio. Thus, an image that may be displayed on a single screen 24 may be "stretched out" across the combination of two screens 24. Such "stretching out" of the image data may be accomplished in software.

Although FIG. 5 depicts display unit 16 as converting first video output 42 to complementary image outputs 42a, 42b, it should be understood that infotainment system 9 could be configured such that complementary image outputs 42a, 42b are transmitted from head unit 12. It is also possible for display unit 16 to be in the form of a rear seat infotainment module, which may include controls for actuating monitors 20, 22 between the two positions and/or for parsing the video/audio content from head unit 12 into either standalone images/audio or composite images/audio to be displayed/played on monitors 20, 22 and possibly audio units 38, 40.

Referring now to FIGS. 4 and 6, in some cases, it may be desirable for users to position first and second video monitors in the second combined position, but use a dual screen mode. For instance, when playing two-player video games, users may want to view two different images directly adjacent to one another. Accordingly, when monitors 20, 22 are in the second position, monitors 20, 22 may be switchable between a first mode in which each of the monitors displays a respective standalone image, and a second mode in which each of the monitors displays a respective half of a composite image. More particularly, as illustrated in FIG. 6, infotainment system 9 may be adapted to allow users to use the dual screen mode when first and second video monitors 20, 22 are joined. In this mode, head unit 12 transmits first and second video outputs 42, 44 to first and second video monitors 20, 22, respectively, to provide two separate standalone complete images/content on screens 24.

Figure 7:
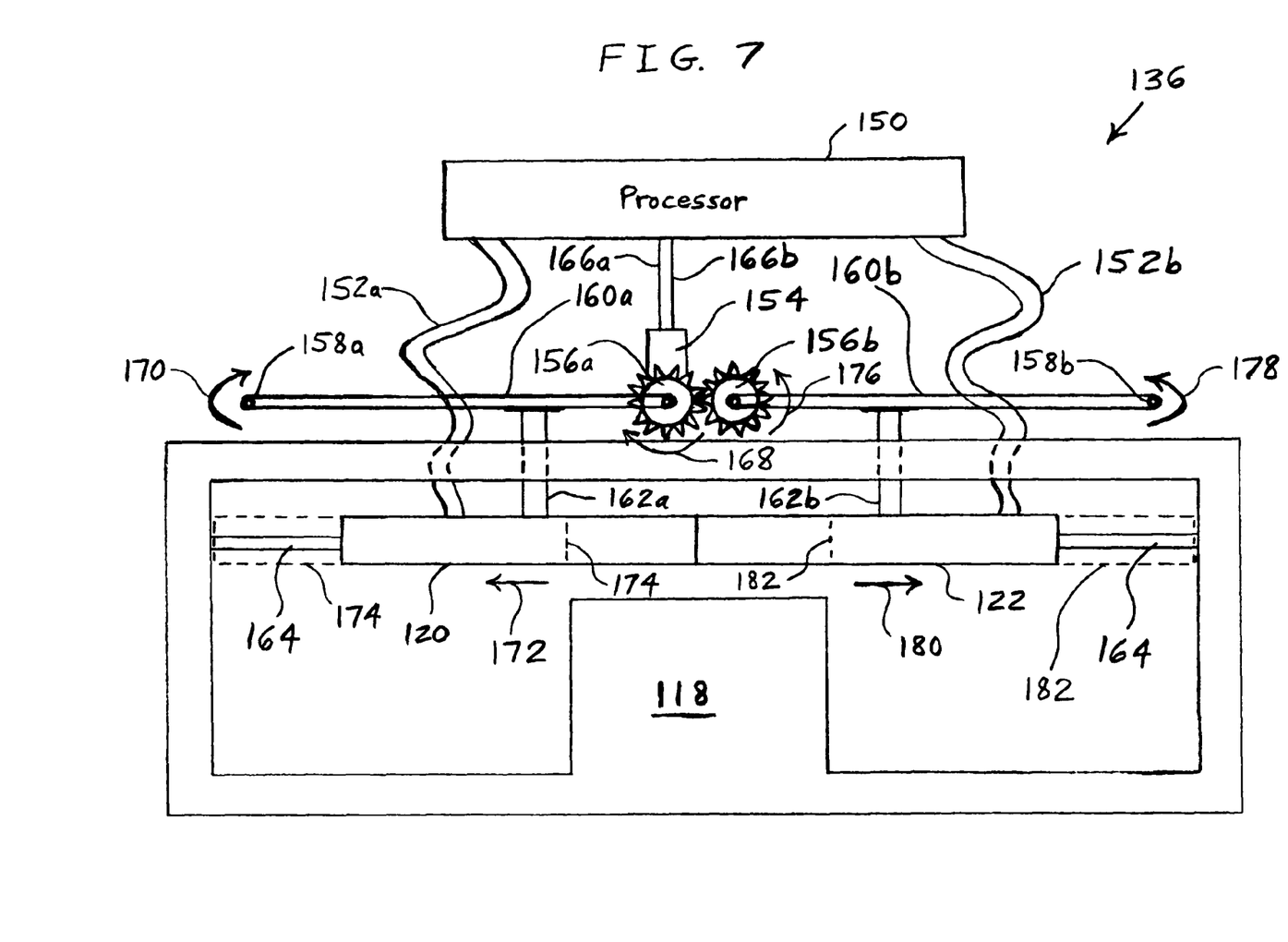
FIG. 7 is an overhead schematic plan view of one embodiment of a translation mechanism suitable for use with the vehicle infotainment system of the present invention.

FIG. 7 illustrates one specific embodiment of a translation mechanism 136 that is suitable for use in an infotainment system of the present invention. Translation mechanism 136 includes housing 118, processor 150, ribbon cables 152a, 152b, motor 154, gears 156a, 156b, rollers 158a, 158b, belts 160a, 160b, couplings 162a, 162b and shaft 164. Processor 150 may be connected to motor 154 via electrical lines 166a, 166b, and may be connected to video monitors 120, 122 via flexible ribbon cables 152a, 152b. Processor 150 may be communicatively coupled to head unit 12. Belt 160a may be carried by roller 158a and gear 156a. Similarly, belt 160b may be carried by roller 158b and gear 156b. Coupling 162a is attached to both belt 160a and monitor 120. Similarly, coupling 162b is attached to both belt 160b and monitor 122. Video monitors 120, 122 are slidably mounted on shaft 164. Both of monitors 120, 122 may be slidably coupled to shaft 164.

In operation, processor 150 receives signals from head unit 12 indicating whether the monitors 120, 122 should be adjacent or spaced apart. If, while in the position of FIG. 7 wherein monitors 120, 122 are adjacent to each other, signals are received indicating that monitors 120, 122 should be spaced apart, then processor 150 may transmit signals to motor 154 to cause monitors 120, 122 to be moved apart. More particularly, motor 154 may rotate gear 156*a* in a clockwise direction 168, which causes belt 160*a* to rotate in a clockwise direction 170 about roller 158*a* and gear 156*a*. As belt 160*a* rotates, coupling 162*a* is carried by belt 160*a* in a leftward direction 172. Coupling 162*a* pulls monitor 120 leftward along with coupling 162*a*. Shaft 164 may support and guide the movement of both monitors 120, 122. Motor 154 may continue to run until monitor 120 is in its left-most position, as indicated at 174.

As shown in FIG. 7, the mesh of the teeth of gears 156*a* and 156*b* causes gear 156*b* to rotate in counterclockwise direction 176 as gear 156*a* rotates in clockwise direction 168. The rotation of gear 156*b* may cause belt 160*b* to rotate in a counterclockwise direction 178 about roller 158*b* and gear 156*b*. As belt 160*b* rotates, coupling 162*b* is carried by belt 160*b* in a rightward direction 180. Coupling 162*b* pulls monitor 122 rightward along with coupling 162*b*. Motor 154 may continue to run until monitor 122 is in its right-most position, as indicated at 182.

Monitors 120, 122 may be moved back to their positions of FIG. 7 from positions 174, 182 by operating motor 154 in the direction that is opposite from that described above. More particularly, processor 150 may control the operation of motor 154 to thereby cause gear 156*a* to rotate in the counterclockwise direction that is opposite to clockwise direction 168. As is evident from the description above, such rotation of gear 156*a* will lead to monitors 120, 122

The video and possibly the audio content from head unit 12 may be transmitted from processor 150 to monitors 120, 122 via ribbon cables 152*a*, 152*b*, respectively. The content transmitted by head unit 12 and carried by 152*a*, 152*b* may depend upon whether a dual screen or single screen mode of operation has been selected, as described above. Ribbon cables 152*a*, 152*b* may be flexible enough that they may maintain electrical connection between processor 150 and monitors 120, 122, respectively, throughout the movements of ribbon cables 152*a*, 152*b*.

Figure 8:
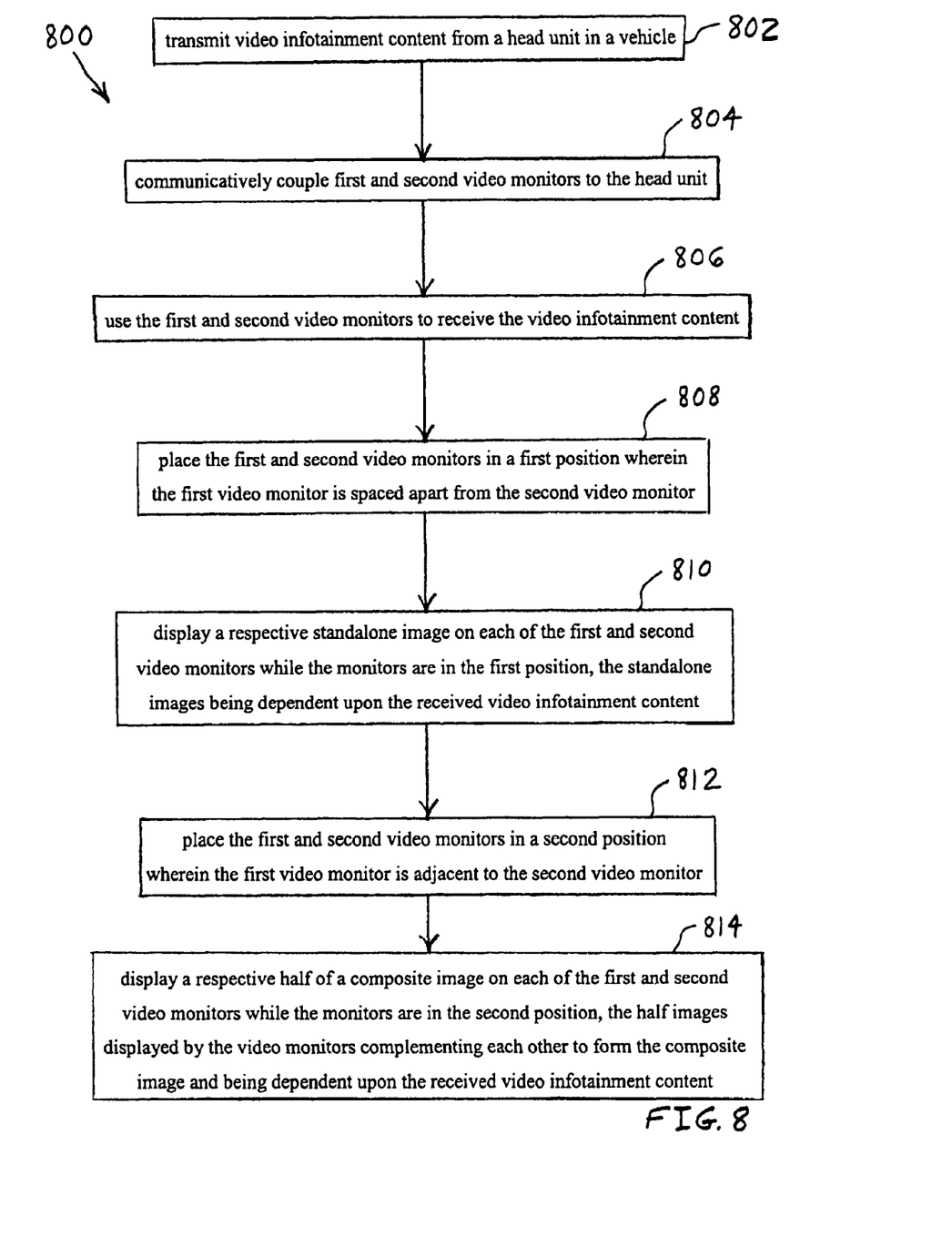
FIG. 8 is a flow chart of one embodiment of a method of operating a vehicle infotainment system of the present invention.

One embodiment of a method 800 of the present invention of operating a vehicle infotainment system is illustrated in FIG. 8. In a first step 802, video infotainment content is transmitted from a head unit in a vehicle. For example, head unit 12 in vehicle 10 may transmit video infotainment content received from one of media 14 to display unit 16. In step 804, first and second video monitors are communicatively coupled to the head unit. As an example, monitors 20, 22 may be communicatively coupled to head unit 12 as illustrated in FIGS. 1, 5 and 6. Next, in step 806, the first and second video monitors are used to receive the video infotainment content. That is, monitors 20, 22 may receive video infotainment content from head unit 12, to which monitors 20, 22 are communicatively coupled. In step 808, the first and second video monitors are placed in a first position wherein the first video monitor is spaced apart from the second video monitor. In a specific example, monitors 20, 22 are placed in the position best illustrated in FIG. 3, wherein monitors 20, 22 are spaced apart from one another. In step 810, a respective standalone image is displayed on each of the first and second video monitors while the monitors are in the first position. The standalone images are dependent upon the received video infotainment content. For example, when in the first position illustrated in FIG. 3, monitors 20, 22 may display respective standalone images, which may be identical images received from the same medium 14. Alternatively, the standalone, displayed images may be received from different, respective media 14. In either case, the standalone images may be determined by, or at least dependent upon, the video infotainment content received from head unit 12. In step 812, the first and second video monitors are placed in a second position wherein the first video monitor is adjacent to the second video monitor. For example, video monitors 20, 22 may be placed in the second position (FIG. 4) wherein monitors 20, 22 are adjacent to one another. In a final step 814, a respective half of a composite image is displayed on each of the first and second video monitors while the monitors are in the second position. The half images displayed by the video monitors complement each other to form the composite image, and are dependent upon the received video infotainment content. In the specific example illustrated in FIG. 4, each of monitors 20, 22, while in the second position, displays a respective half image which complements the other half image to form a complete composite image between the two monitors. The half images may be determined by, or at least dependent upon, the video infotainment content received from head unit 12.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle, comprising:
   a vehicle body;
   left-hand and right-hand video monitors, each of said video monitors including opposing top and bottom edges and opposing left-hand and right-hand lateral edges extending between said top and bottom edges; and
   a translation mechanism coupling said video monitors to said vehicle body such that said video monitors are movable in horizontal directions between a first position wherein said right-hand lateral edge of said left-hand video monitor is spaced apart from said left-hand lateral edge of said right-hand video monitor, and a second position wherein said right-hand lateral edge of said left-hand video monitor is adjacent to said left-hand lateral edge of said right-hand video monitor, wherein said translation mechanism includes a housing mountable to the vehicle, each of said first and second monitors being pivotably mounted to said housing such that each of said first and second monitors is pivotable about a horizontal axis between an open position in which the monitor is uncovered and viewable and a closed position in which the monitor is covered and unviewable.

2. The vehicle of claim 1 wherein each of said video monitors is configured to:
   display a respective standalone image while said monitors are in the first position; and
   display a respective half of a composite image while said monitors are in the second position, the half images displayed by said video monitors complementing each other to form the composite image.

3. The vehicle of claim 2 wherein, while said monitors are in the second position, said monitors are switchable between:
   a first mode in which each of said monitors is configured to display a respective standalone image; and
   a second mode in which each of said monitors is configured to display a respective half of a composite image.

4. The vehicle of claim 1 wherein each of said video monitors includes a respective audio unit configured to play audio content corresponding to video content displayed by said monitor.

5. The vehicle of claim 1 wherein each of said monitors includes a frame and a visual display screen mounted in said frame, said frame of said left-hand monitor having a width proximal to said right-hand lateral edge of less than four millimeters, said frame of said right-hand monitor having a width proximal to said left-hand lateral edge of less than four millimeters.

6. The vehicle of claim 1 wherein each of said monitors includes a frame and a visual display screen mounted in said frame, said frame of said left-hand monitor having a width proximal to said right-hand lateral edge that is less than a width of said frame proximal to a left-hand lateral edge of said left-hand monitor, said frame of said right-hand monitor having a width proximal to said left-hand lateral edge that is less than a width of said frame proximal to a right-hand lateral edge of said right-hand monitor.

7. The vehicle of claim 1 wherein each of said first and second monitors is pivotably mounted to said housing and is pivotable about a same horizontal axis between the open position and the closed position.

8. An infotainment system for use in a vehicle, said infotainment system comprising:
a head unit mountable to the vehicle and adapted to transmit video infotainment content;
first and second video monitors communicatively coupled to said head unit, said first and second video monitors being configured to display images dependent upon video content received from said head unit, said first and second video monitors being movable along an axis between:
a first position wherein said first video monitor is spaced apart from said second video monitor, and each of said first and second video monitors is configured to display a respective standalone image; and
a second position wherein said first video monitor is adjacent to said second video monitor, and each of said first and second video monitors is configured to display a respective half of a composite image such that the half images displayed by said video monitors complement each other to form the composite image; and
a housing wherein each of said first and second monitors is pivotably mounted to said housing and is pivotable about the axis between an open position in which the monitor is uncovered and viewable and a closed position in which the monitor is covered and unviewable.

9. The infotainment system of claim 8 wherein, while said monitors are in the second position, said monitors are switchable between:
a first mode in which each of said monitors is configured to display a respective standalone image; and
a second mode in which each of said monitors is configured to display a respective half of a composite image.

10. The infotainment system of claim 8 wherein each of said video monitors includes a respective audio unit configured to play audio content corresponding to video content displayed by said monitor.

11. The infotainment system of claim 8 wherein each of said monitors includes a frame and a visual display screen mounted in said frame, each said frame having four sides including an abutting side that abuts said abutting side of the other frame when said monitors are in the second position, each of said abutting sides having a width of less than four millimeters.

12. The infotainment system of claim 8 wherein each of said monitors includes a frame and a visual display screen mounted in said frame, each said frame having four sides including three non-abutting sides and an abutting side that abuts said abutting side of the other frame when said monitors are in the second position, each of said abutting sides having a width that is less than the widths of the three non-abutting sides of the same monitor.

13. The infotainment system of claim 8 further comprising a motor coupled to said monitors, said motor adapted to effect the movement of said first and second video monitors between said first and second positions.

14. The infotainment system of claim 8 wherein each of said first and second monitors is seated within a respective recess while in the closed position.

15. A method of operating a vehicle infotainment system, said method comprising the steps of:
providing a head unit in the vehicle;
transmitting video infotainment content from said head unit;
communicatively coupling first and second video monitors to said head unit;
using said first and second video monitors to receive the video infotainment content;
placing said first and second video monitors in a first position wherein said first video monitor is spaced apart from said second video monitor;
displaying a respective standalone image on each of said first and second video monitors while said monitors are in the first position, the standalone images being dependent upon the received video infotainment content;
placing said first and second video monitors in a second position wherein said first video monitor is adjacent to said second video monitor;
displaying a respective half of a composite image on each of said first and second video monitors while said monitors are in the second position, the half images displayed by said video monitors complementing each other to form the composite image and being dependent upon the received video infotainment content;
pivotably mounting a housing to each of said first and second monitors; and
pivoting each of said first and second monitors about a same axis between an open position in which the monitor is uncovered and viewable and a closed position in which the monitor is covered and unviewable.

16. The method of claim 15 comprising the further step of switching said monitors between a first mode in which each of said monitors displays a respective standalone image, and a second mode in which each of said monitors is configured to display a respective half of a composite image while said monitors are in the second position, said switching step occurring while said monitors are in the second position.

17. The method of claim 15 wherein each of said video monitors includes a respective audio unit, said method comprising the further step of playing audio content on each of said audio units corresponding to video content displayed by said respective monitor.

18. The method of claim 15 comprising the steps of:
coupling a motor to said monitors; and
using said motor to effect movement of said first and second video monitors between said first and second positions.

19. The method of claim 15 comprising the further step of providing each of said monitors with a frame and a visual display screen mounted in said frame, each said frame having four sides including an abutting side that abuts said abutting side of the other frame when said monitors are in the second position, each of said abutting sides having a width of less than four millimeters.

20. The method of claim 15 wherein each of said first and second video monitors extends downward from said housing when in the open position.

* * * * *

UNITED STATES PATENT AND TRADEMARK OFFICE
CERTIFICATE OF CORRECTION

| | | |
|---|---|---|
| PATENT NO. | : 8,363,170 B2 | Page 1 of 1 |
| APPLICATION NO. | : 11/818488 | |
| DATED | : January 29, 2013 | |
| INVENTOR(S) | : Hakan Kostepen | |

It is certified that error appears in the above-identified patent and that said Letters Patent is hereby corrected as shown below:

Title Page, Item (73) Assignee should read as follows:
        Panasonic Automotive Systems Company of America, Division
        of Panasonic Corporation of North America     In the Drawings:

Sheet 2 of 8, Figure 2, delete "2C" and replace with --20--.

Signed and Sealed this
Thirtieth Day of July, 2013

Teresa Stanek Rea
*Acting Director of the United States Patent and Trademark Office*